US011040918B2

(12) United States Patent
Losic et al.

(10) Patent No.: US 11,040,918 B2
(45) Date of Patent: Jun. 22, 2021

(54) GRAPHENE FOR FERTILIZER APPLICATIONS

(71) Applicant: THE UNIVERSITY OF ADELAIDE, Adelaide (AU)

(72) Inventors: Dusan Losic, Seaford Rise (AU); Shervin Kabiri, Payneham South (AU); Michael McLaughlin, Montacute (AU); Diana Tran, Burton (AU); Ivan Andelkovic, Adelaide (AU)

(73) Assignee: The University of Adelaide, Adelaide (AU)

( * ) Notice: Subject to any disclaimer, the term of this patent is extended or adjusted under 35 U.S.C. 154(b) by 0 days.

(21) Appl. No.: 16/468,712

(22) PCT Filed: Dec. 11, 2017

(86) PCT No.: PCT/AU2017/051362
§ 371 (c)(1),
(2) Date: Jun. 12, 2019

(87) PCT Pub. No.: WO2018/107212
PCT Pub. Date: Jun. 21, 2018

(65) Prior Publication Data
US 2020/0095175 A1 Mar. 26, 2020

(30) Foreign Application Priority Data
Dec. 12, 2016 (AU) .................. 2016905131

(51) Int. Cl.
C05D 9/00 (2006.01)
C05D 9/02 (2006.01)
(Continued)

(52) U.S. Cl.
CPC ................. C05D 9/02 (2013.01); C05D 9/00 (2013.01); C05G 3/44 (2020.02); C05G 5/12 (2020.02);
(Continued)

(58) Field of Classification Search
None
See application file for complete search history.

(56) References Cited

U.S. PATENT DOCUMENTS 6,254,654 B1 * 7/2001 Van Barneveld ...... C09K 17/40
71/8
6,322,607 B1 * 11/2001 Brown .................... C05B 19/00
71/33

(Continued)

FOREIGN PATENT DOCUMENTS

CN 104829340 A 8/2015
CN 106008018 A 10/2016
(Continued)

OTHER PUBLICATIONS

Jingquan Liu, et al; Graphene and graphene oxide as new nanocarriers for drug delivery applications; www.elsevier.com/locate/actabiomat; 15 pgs.
(Continued)

Primary Examiner — Wayne A Langel
(74) Attorney, Agent, or Firm — Renner Kenner Greive Bobak Taylor & Weber

(57) ABSTRACT

A new slow-release fertilisers is described that is formed by applying graphene oxide (GO) as a carrier for micronutrients such as copper (Cu) and zinc (Zn), in which the micronutrients are efficiently bonded with the functional groups at the surface and sides of the GO sheets due to their affinity to the unpaired oxygen atoms in the GO. The prepared Cu-graphene oxide (Cu-GO) and Zn-graphene oxide (Zn-
(Continued)

GO) fertilizers showed a biphasic dissolution behaviour compared to commercial zinc sulphate ($ZnSO_4$) and copper sulphate ($CuSO_4$) fertilizer granules, displaying both fast- and slow-release micronutrient release.

15 Claims, 12 Drawing Sheets

(51) Int. Cl.
*C05G 5/12* (2020.01)
*C05G 5/30* (2020.01)
*C05G 3/40* (2020.01)
*C01B 32/198* (2017.01)

(52) U.S. Cl.
CPC .............. *C05G 5/30* (2020.02); *C01B 32/198* (2017.08); *C01P 2002/70* (2013.01)

(56) References Cited

U.S. PATENT DOCUMENTS

| | | | |
|---|---|---|---|
| 8,974,763 B1* | 3/2015 | Jain | C05G 5/12 |
| | | | 423/545 |
| 2016/0130191 A1* | 5/2016 | Clark | C05B 19/00 |
| | | | 71/36 |
| 2018/0009722 A1* | 1/2018 | Chiu | C05D 9/00 |
| 2018/0346659 A1* | 12/2018 | Miller | A61L 9/012 |

FOREIGN PATENT DOCUMENTS

| | | |
|---|---|---|
| EP | 3481791 A0 | 5/2019 |
| KR | 20150121740 A | 10/2015 |
| WO | 2015066691 A1 | 5/2015 |
| WO | 2016/126596 A2 | 8/2016 |

OTHER PUBLICATIONS

Xiaoying Yang, et al; High-efficiency loading and controlled release of doxorubicin hydrochloride on graphene oxide; J. Phys. Chem C 2008, 112, 17554-17558; 5 pgs.

D. Depan, et al.; Controlled release of drug from folate-decorated and graphene mediated drug delivery system: Synthesis, loading efficiency, and drug release response; www.elsevier.com/locate/msec; 8 pgs.

Tran Diana N. H., Kabiri Shervin, Wang Luoshan, Losic Dusan; "Engineered graphene nanoparticle aerogel composites for efficient removal of phosphate from water" Journal of Materials Chemistry A, vol. 3, No. 13, pp. 6844-6852, XP009521132, DOI: 10.1 039/c4ta06308b; Feb. 10, 2015 (D3 in Indian Office Action).

Indian Office Action dated Feb. 8, 2021 (6 pages).

* cited by examiner

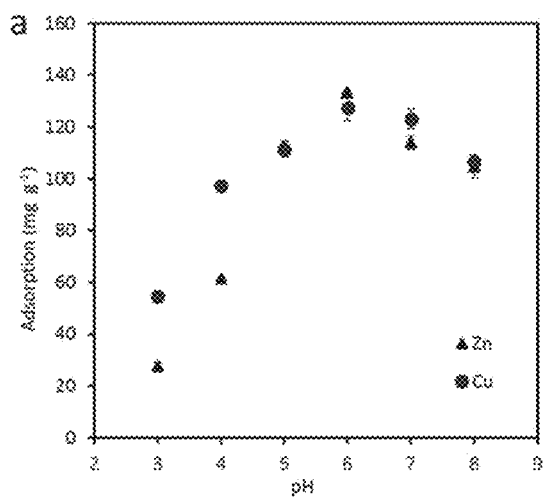
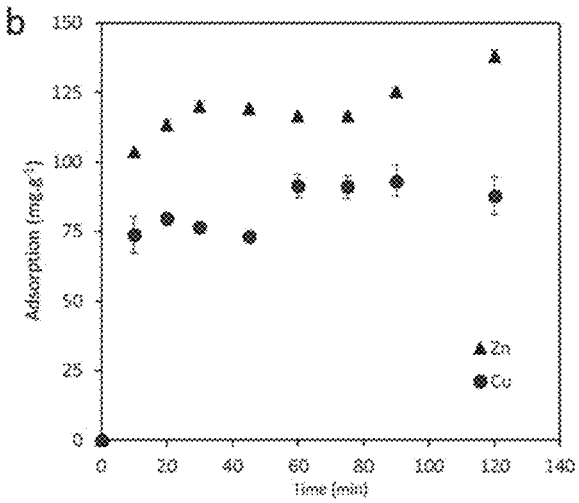
Figure 3a
Figure 3b
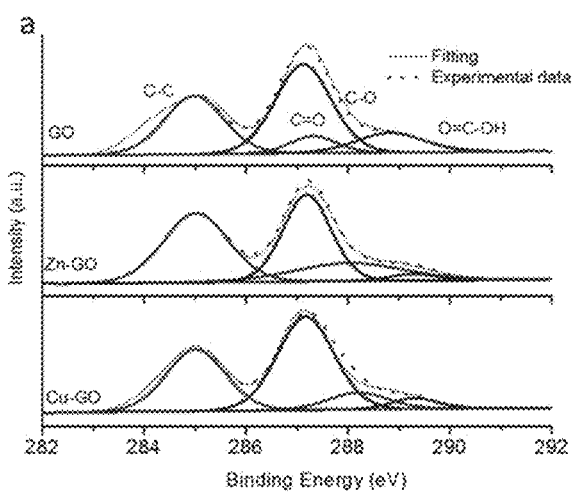
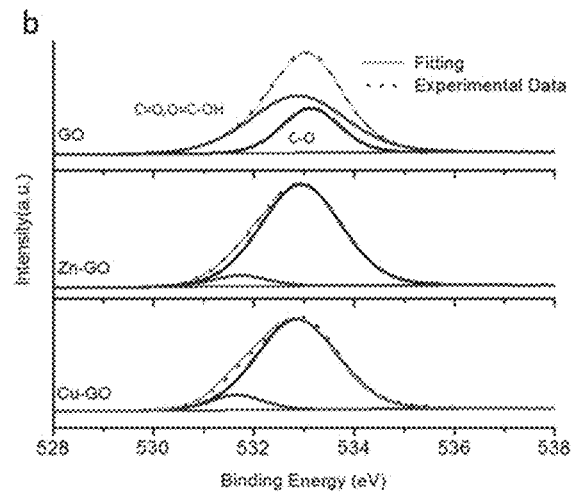
Figure 4a
Figure 4b

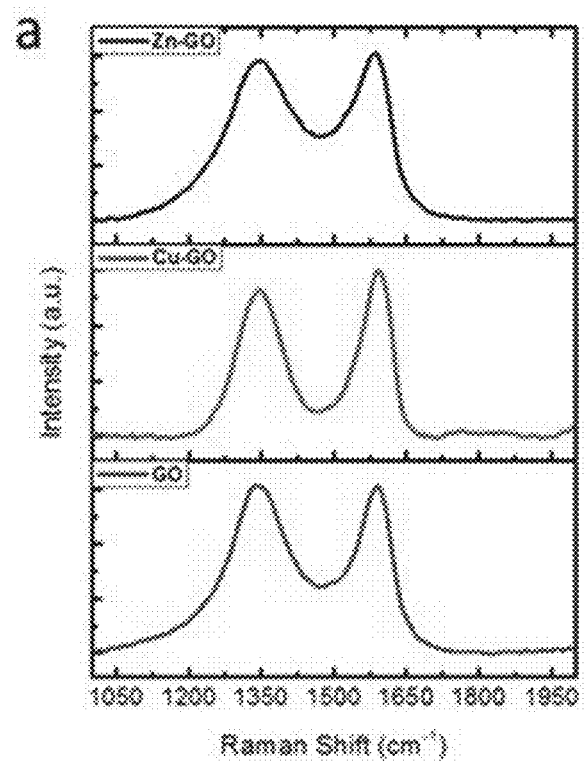
Figure 5a
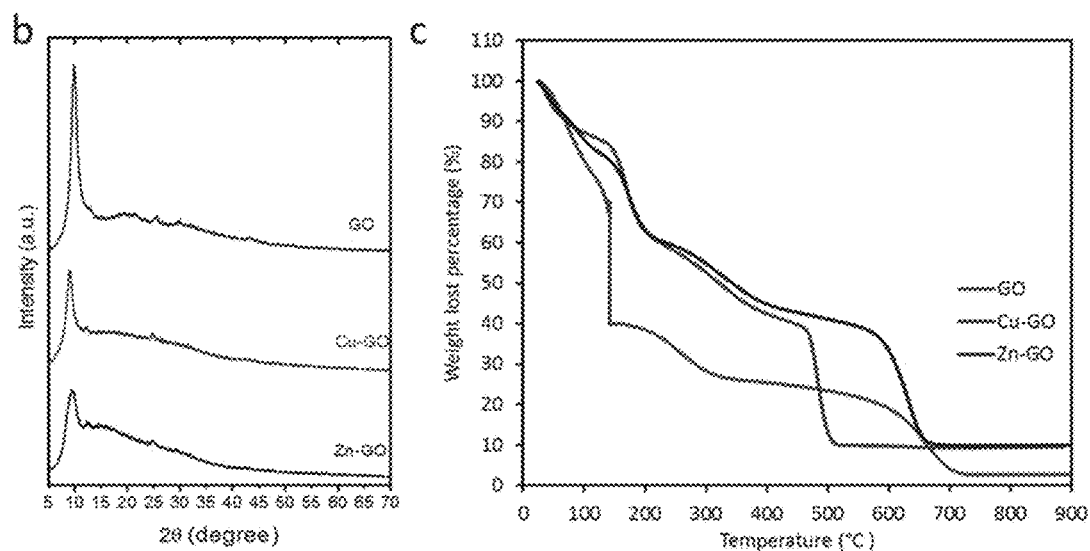
Figure 5b
Figure 5c

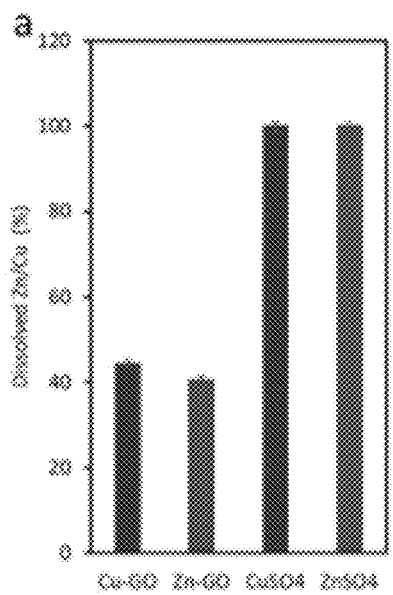
Figure 6a
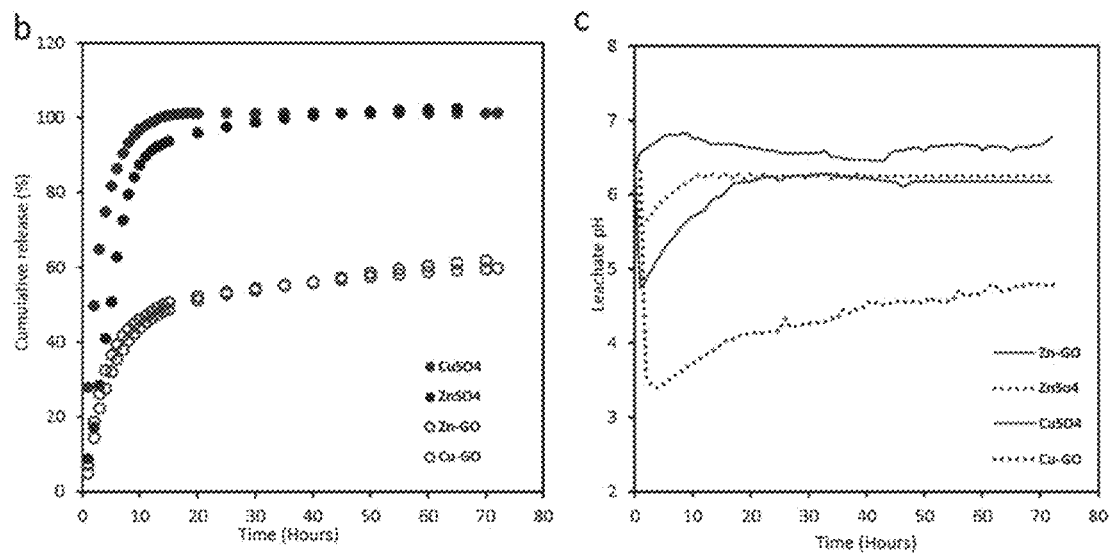
Figure 6b
Figure 6c

GRAPHENE FOR FERTILIZER APPLICATIONS

FIELD OF THE INVENTION

This present invention relates to slow release fertilisers (SRFs) containing graphene oxide (GO) or graphene for plant growth.

In particular, the invention relates to SRFs in which GO or graphene is employed as a carrier for essential plant nutrients, which provide improved continuous release of the nutrients over time. In additional, the SRFs of the present invention have improved physical characteristics, such as improved impact strength and abrasion resistance, which results in greater resistance to physical degradation during transport and handling.

BACKGROUND

Plant macro- and micronutrients are essential for the growth and development of crops and as such, have been employed for many years to optimise plant yield. Some examples of macronutrients include, nitrogen (N), potassium (K), sulfur (S), magnesium (Mg) and calcium (Ca). Whilst, some common essential plant micronutrients include, but are not limited to, zinc (Zn), copper (Cu), iron (Fe), manganese (Mn), boron (B), cobalt (Co), chlorine (Cl), chromium (Cr) and nickel (Ni). Notably, deficiencies in any of these essential plant macro- or micronutrients can lead to significant adverse affects in relation to plant growth and crop yields, which in turn affects food supplies and human health.

Macronutrient and micronutrient supply in traditional fertilisers has predominantly been in the form of water-soluble salts. However, these have been shown to result in a number of issues including, loss of nutrients due to leaching and run-off, high dosage requirements, high associated economic costs and serious environmental problems. Moreover, there is also the problem of the strong retention of many macronutrients and micronutrients to the soil, particularly through adsorption to clays and organic matter or precipitation of insoluble compounds in the soil. As a consequence of the above-mentioned issues, the efficacy of macronutrient and micronutrient fertilisers is greatly reduced.

In order to address the above problems and improve the efficacy of macronutrient and micronutrient fertilisers, recent research has been focused on the development of SRFs or controlled release fertilisers (CRFs), which provide plant essential macronutrients and micronutrients in a slow sustained manner in comparison with traditional fertilisers. Theoretically, the benefits of SRFs include sustained correction of mineral deficiency and reductions in the frequency of fertilization required, which consequently minimises the associated costs and environmental pollution.

Despite recent focus on the development of slow release fertilisers, there remains a lack of commercially available SRFs. The majority of current research is focused on SRFs that are based on either diffusion through a coating or slow hydrolysis. These SRFs have been shown to possess a number of drawbacks, particularly due to their high cost and also variable release profiles in response to different environmental factors, such as soil pH, ionic content and temperature.

In addition, commercially available SRFs, and indeed other fertilisers, suffer from a lack of structural integrity and constant handling, application and transport of the fertiliser material causes the fertiliser pellets to break down into smaller particles due to physical contact with each other as well as with the handling apparatus. Over time this can result significant losses of fertiliser material as well as reduced dispersal and efficacy of fertiliser as the smaller particles (dust) are not readily dispersed and have a greater surface area which results in increased release of fertiliser than what is required from a SRF Thus, there is a need to develop new SRFs that provide further improvements over the prior art.

OBJECT OF THE INVENTION

It is an object of the present invention to overcome, or at least substantially ameliorate the disadvantages and shortcomings of the prior art.

Other objects and advantages of the present invention will become apparent from the following description, taken in connection with the accompanying examples, wherein by way of illustration and example, several embodiments of the present invention are disclosed.

SUMMARY OF THE INVENTION

According to the present invention, although this should not be seen as limiting the invention in any way, there is provided:

A fertilizer composition including a graphene support and a fertiliser material.

In preference, the graphene support is graphene oxide.

In preference, the graphene support is graphene.

In preference, the fertiliser material is a primary nutrient or macronutrient.

In preference, the fertiliser material is a micronutrient.

In preference, the micronutrient is at least one selected from the group consisting of copper, potassium, zinc, magnesium, sulphur, chromium, nickel, boron, cobalt, iron, and calcium.

In preference, the primary nutrient is at least one selected from the group consisting of calcium, magnesium, manganese, sulphur, nitrogen, phosphorus and potassium.

In preference, the fertiliser material includes a primary nutrient and a micronutrient.

In preference, the at least one micronutrient is zinc.

In preference, the at least one micronutrient is copper.

In preference, the at least one micronutrient is iron.

In preference, the micronutrient is bonded to the surface of the graphene support.

In preference, the graphene has a plurality of functional groups on its surface.

In preference, the functional groups are metals.

In preference, the metal is a metal cation.

In preference, the metal cation is a monovalent metal cation.

In preference, the metal cation is a divalent metal cation.

In preference, the metal cation is a trivalent metal cation.

In preference, the metal or metal cation is selected from the group consisting of $Li^+$, $Na^+$, $Mg^{2+}$, $Fe^+$, $Fe^{2+}$, $Ni^{2+}$, $zn^{2+}$, $Co^{2+}$, $Al^{3+}$, $K^+$, $Bi^{3+}$, or $Cu^{2+}$.

In preference, the functional groups are oxide-hydroxides of metals.

In preference, the functional groups are oxide-hydroxides of iron.

In preference, the functional groups is $FeO(OH)$.

In preference, the functional group is Fe.

In preference, the at least one macronutrient or micronutrient is bonded to the functional groups.

In preference, the fertiliser composition is a slow release fertiliser composition.

In preference, the fertiliser material forms a continuous coating around the graphene support.

In preference, the fertilizer composition is a slow release fertiliser composition.

In a further form of the invention, there is composition when used as a fertilizer, the composition including a graphene support and a fertiliser material.

A further form of the invention resides in a method of providing macronutrients or micronutrients to a plant, comprising applying a fertilizer composition the fertiliser composition including a graphene support and a fertiliser material.

A method of fertilising a plant, the method including the steps of preparing a fertilizer composition, the fertiliser composition including a graphene support and a fertiliser material, the graphene support being coated with the fertiliser material, applying the fertiliser composition to an agricultural crop.

A further form of the invention resides in the method of making a slow release fertiliser composition, the method including the steps of providing a plurality of graphene support structures, the graphene support structures having a plurality of functional groups thereon, providing a fertilizer material in a salt form such that the plurality of graphene support structures are at least partially coated with the fertilizer material and heating the at least partially coated graphene support structures to form a coating of fertilizer material on the graphene support structures.

In preference, the fertilizer material in a salt form is a nutrient salt.

In preference, the nutrient salt is a primary nutrient salt or macronutrient salt.

In preference, the nutrient salt is a micronutrient salt.

In preference the nutrient salt is selected from the group consisting of aluminum sulfate, amino acid salt, ammonium chloride, ammonium molybdate, ammonium nitrate, ammonium phosphate, ammonium phosphate-sulfate, ammonium sulfate, borax, boric acid, calcium ammonium nitrate, calcium silicate, calcium chloride, calcium cyanamide, calcium nitrate, copper acetate, copper nitrate, copper oxalate, copper oxide, copper sulfate, diammonium phosphate, iron-ethylenediamine-N,N'-bis, iron-ethylenediaminetetraacetic acid, elemental sulfur, ferric sulfate, ferrous ammonium phosphate, ferrous ammonium sulfate, ferrous sulfate, gypsium, humic acid, iron ammonium polyphosphate, iron chelates, iron sulfate, lime, magnesium sulfate, manganese chloride, manganese oxide, manganese sulfate, monoammonium phosphate (MAP), monopotassium phosphate, polyhalite, potassium bromide, potassium chloride (MOP), potassium nitrate, potassium polyphosphate, potassium sulfate, sodium chloride, sodium metasilicate, sodium molybdate, sodium nitrate, sulfate of potash (SOP), sulfate of potash-magnesia (SOP-M), superphosphate, triple superphosphate, urea, urea formaldehyde, zinc oxide, zinc sulfate, zinc carbonate, zinc phosphate, and zinc chelates, as well as combinations of one or more of these salts.

In a further form of the invention there is a co-granulated fertilizer composition, comprising a fertilizer material co-granulated with a graphene, graphene oxide or a mixture thereof.

In preference, the graphene or graphene oxide is in an amount of between 0.01% to 1% w/w to fertilizer material.

In preference, the graphene or graphene oxide is in an amount of between 0.02% to 0.7% w/w to fertilizer material.

In preference, the graphene or graphene oxide is in an amount 0.02% w/w to fertilizer material.

In preference, the graphene or graphene oxide is in an amount 0.05% w/w to fertilizer material.

In preference, the graphene or graphene oxide is in an amount 0.5% w/w to fertilizer material.

In preference, the fertilizer material includes a graphene support material.

In preference, the graphene support is graphene oxide.

In preference, the graphene support is graphene.

In preference, the fertiliser material is a primary nutrient or macronutrient.

In preference, the fertiliser material is a micronutrient.

Many variations and modifications may be made to the above embodiments and preferred embodiments, and are merely possible examples of the implementation of the present invention to provide a better understanding of the principles of the disclosure. Other variations and modifications may be made to the above without departing substantially from the scope of the present disclosure.

DETAILED DESCRIPTION

Used herein, the term "graphene" or "GN" refers to laminate sheets of carbon atoms, which may be single layer or multilayer structures.

The term "graphene oxide" or "GO" refers to oxidised graphene being a water dispersible graphene derivative having a high density of functional groups, such as oxygen functional groups.

The term "graphene support" refers to structural graphene or GO that supports the loading of nutrient material, such as micronutrients or primary nutrients on its surface.

The term "micronutrient" refers to elements needed for plant growth in small amounts and include boron, chlorine, copper, iron, manganese, molybdenum, zinc.

The term "primary nutrient" or "macronutrients" refers to nutrients needed in large amounts to achieve desirable plant or crop growth, and can include calcium, manganese, magnesium, sulphur, nitrogen, phosphorus and potassium.

The term "fertilizer" refers to a material of natural or synthetic origin that is supplied to a plant to supply one or more plant nutrients required for plant growth. In embodiments the fertilizer may include one or more nutrients, either macronutrients or micronutrients.

BRIEF DESCRIPTION OF THE DRAWINGS

By way of example only, an embodiment of the invention is described more fully hereafter, with reference to the accompanying drawings, in which:

FIG. 3 shows the sorption of Zn and Cu on GO as a function of (a) pH and (b) contact time (For kinetic study the pH of solution was fixed at 6 and 4.5 for Zn and Cu adsorption, respectively);

FIG. 4 shows high resolution XPS spectra of (a) C1s and (b) O1s obtained from GO sheets before and after metal ion sorption (Zn-GO and Cu-GO);

FIG. 5 shows (a) Raman Spectra, (b) XRD patterns and (c) TGA curves of GO, Zn-GO and Cu-GO;

FIG. 6 shows the a) batch water solubility of Zn and Cu from Zn-GO, Cu-GO, $ZnSO_4$ and $CuSO_4$ fertilizers, (b) kinetic release study of Zn from Zn-GO and $ZnSO_4$, and Cu from Cu-GO and $CuSO_4$ from the columns, and (c) changes in the pH of the elutes from the columns as a function of time

DETAILED DESCRIPTION OF THE INVENTION

Although the invention has been herein shown and described in what is conceived to be the most practical and preferred embodiment, it is recognized that departures can be made within the scope of the invention, which is not to be limited to the details described herein but it is to be accorded the full scope of the appended claims so as to embrace any and all equivalent devices and apparatus.

Figure 1:
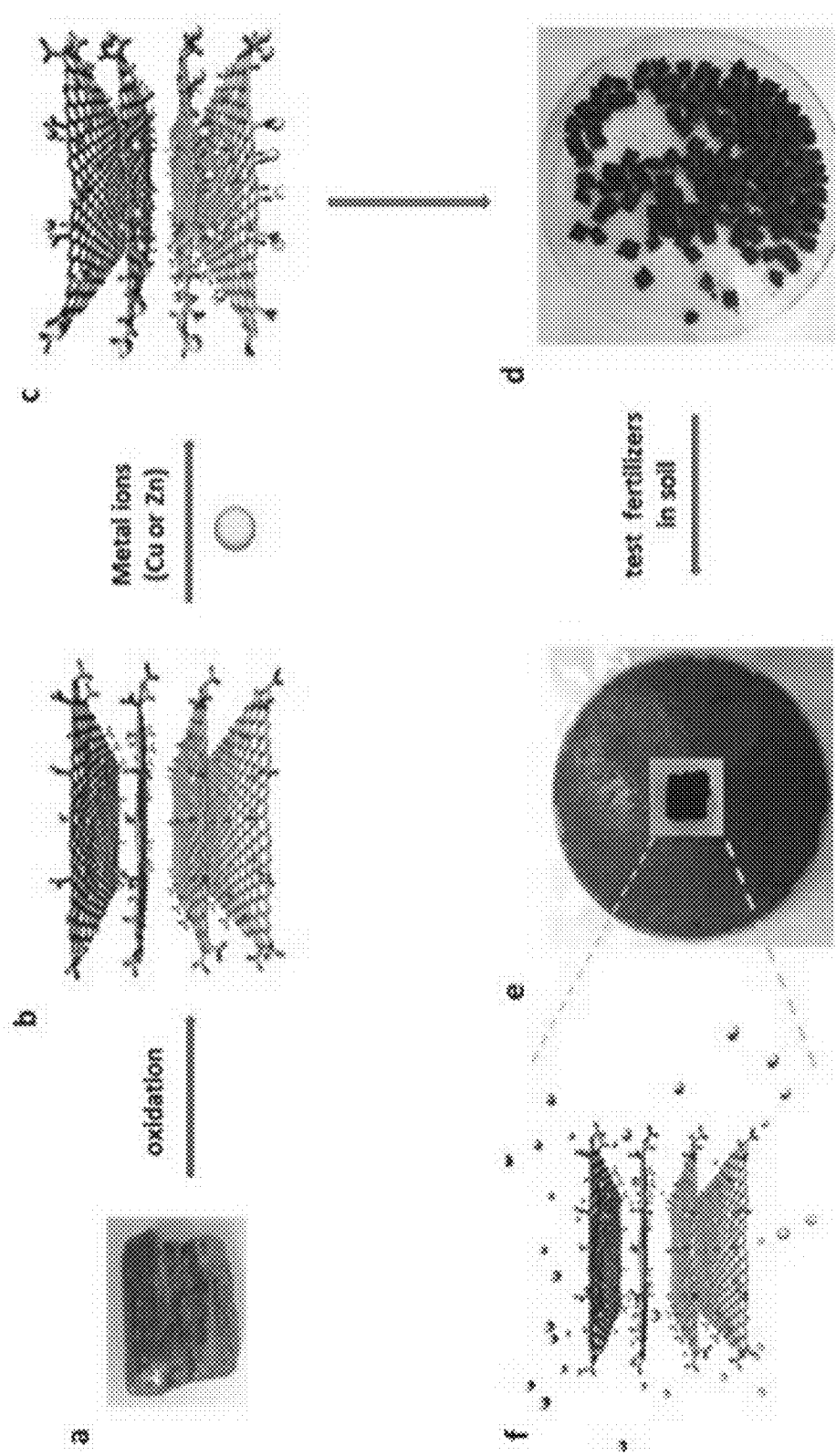
FIG. 1 is a schematic of the preparation and release of slow release graphene oxide-zinc/copper fertilizers.

FIG. 1 shows a schematic view of the present invention being the preparation and release of slow release graphene oxide-zinc/copper fertilizers. Natural graphite rock can be use as the initial material (a), (b) graphene oxide sheets prepared from graphite by the acid exfoliation process with different functional groups (—OH and —COOH) on its basal planes and edges, (c) graphene oxide sheets (graphene support material) are then loaded with Cu and/or Zn metal ions that are attached to the oxygen functional groups on the surface and edges of the sheets, (d-e) digital photos of the graphene oxide-metal based fertilizer pellets (Cu-GO or Zn-GO) that were added to the soil, and (f) the release of metal ions from graphene oxide based slow-release fertilisers.

To confirm the capability of GO as a carrier for different nutrients a series of batch adsorption experiments were conducted in which the adsorption capacity of GO for Cu and Zn was measured. The influence of pH on the adsorption of the metal ions was also taken into consideration, as this affects the speciation of metal ions, as well as the surface properties of the GO sheets. This is relevant for determining the adsorption capacity of Zn and Cu on GO sheets and to prevent the precipitation of their oxide or hydroxides. As shown in FIG. 3a the adsorption of Cu ions increased gradually from pH 3-6 and remained constant at pH 6-7 before decreasing at pH 8. At a lower concentration of Cu within a pH range of 3-7.5, $Cu^{+2}$ is the dominant species of Cu ions, while copper hydroxide ($Cu(OH)_2$) is the dominant species at higher pH values up to 12.3. Furthermore, the $pH_{pzc}$ (point of zero charge) value of GO is 3.8-3.9, which means at pH>3.9, GO is negatively charged and thus the electrostatic interactions of the positively charged metal ions and the negative surface of the GO sheets becomes stronger. At higher pH the formation of hydroxide complexes of copper ($CuOH^+$) and the precipitation of solid $Cu(OH)_2$ in solution occurs, hence the adsorption of Cu decreases at pH 6-8. In the case of Zn, the adsorption sharply increases with pH from pH 3 to 6, as the predominant Zn species is $Zn^{+2}$ in the pH range of 3-6 and the increasing negative charge on the GO sheets with increasing pH thus results in stronger adsorption. The slight decrease of Zn adsorption at pH 7-8 can be explained by the formation of $Zn(OH)_2$ that was seen to precipitate in the solution.

FIG. 3b shows an increase in sorption of metal ions on the GO sheets with increasing time. The maximum sorption for $Cu^{+2}$ and $Zn^{+2}$ occurred at 60 and 120 min contact time, respectively. Equilibrium was immediately reached after the contact period. Both pseudo-first and pseudo-second-rate adsorption kinetic models were used to study the kinetics of the sorption process.

The experimental $q_e$ values (137 mg $g^{-1}$ and 93 mg $g^{-1}$ for $Zn^{+2}$ and $Cu^{+2}$, respectively) were close to the calculated $q_e$ values from the pseudo-second-order equation (133 mg $g^{-1}$ and 73 mg $g^{-1}$ for $Zn^{+2}$ and $Cu^{+2}$, respectively). The correlation coefficients of the pseudo-second-order kinetic models were also higher than those of the pseudo-first order models, which suggest that the sorption of metal ions on the GO sheets is controlled by chemical adsorption. This involves the strong surface complexation of the metal ions with the oxygen functional groups on the surface of the GO sheets. Therefore, the sorption capacity is directly related to the number of active sites that exist on the GO surface.

XPS measurements were performed on the GO sheets before and after metal ion sorption. The appearance of Zn and Cu peaks in the survey spectra of Zn-GO and Cu-GO, respectively, confirms the attachment of the metal ions to the GO structure. High resolution analysis shed light on the chemical composition of the Zn-GO and Cu-GO composites (FIGS. 4a and 4b). Control samples were used to systematically probe the changes in the composite chemistry after the sorption process. Deconvolution of the C1s spectrum for GO showed that the primary peak at 285 eV is attributed to the $sp^2$-hybridized carbon of the GO sheets (FIG. 4a). The peak was asymmetric due to the presence of other carbon functionalities. These arise due to $sp^3$/aliphatic hydrocarbon species and carbon-oxygen species such as C—OH, C—O—C, C=O, and C—OOH.[34] The C1s spectra of Zn-GO and Cu-GO composites could also be fitted to four peaks corresponding to C=C or C—C, C—O, C=O and O=C—O. Compared with the C1s spectrum of GO, the binding energy of the first two carbon species almost correlate with each other. However, the binding energy of the C=O and O=C—O peaks of Zn-GO and Cu-GO composites were slightly shifted towards higher bonding energy directions after Zn and Cu functionalization, which probably demonstrates the inclusion of the metal ions on the GO matrix. Analysis of the O1s XPS spectra of GO, Zn-GO and Cu-GO and the binding energies of oxygen in the various functional groups were allocated according to those in the literature (FIG. 4b). (Marcano, D. C.; Kosynkin, D. V.; Berlin, J. M.; Sinitskii, A.; Sun, Z.; Slesarev, A.; Alemany, L. B.; Lu, W.; Tour, J. M., Improved Synthesis of Graphene Oxide. *ACS Nano* 2010, 4 (8), 4806-4814 and Larciprete, R.; Lacovig, P.; Gardonio, S.; Baraldi, A.; Lizzit, S., Atomic oxygen on graphite: Chemical characterization and thermal reduction. *Journal of Physical Chemistry C* 2012, 116 (18), 9900-9908). The generally accepted deconvolution scheme for the O1s core level consists of a component at the lowest binding energy (BE) to doubly-bonded oxygen species (either in the carbonyl C=$\underline{O}$ or carboxyl group $\underline{O}$=C—OH) and another component at higher BE related to singly-bonded oxygen (C—$\underline{O}$). (Yang, D.; Velamakanni, A.; Bozoklu, G.; Park, S.; Stoller, M.; Piner, R. D.; Stankovich, S.; Jung, I.; Field, D. A.; Ventrice Jr, C. A.; Ruoff, R. S., Chemical analysis of graphene oxide films after heat and chemical treatments by X-ray photoelectron and Micro-Raman spectroscopy. *Carbon* 2009, 47 (1), 145-152). The BE associated with doubly-bonded oxygen species (C=O and O=C—OH) are 532.9, 531.6 and 531.7 eV for GO, Cu-GO and Zn-GO, respectively, whereas the binding energies corresponding to C—O are 533.1, 532.8 and 532.9 eV for GO, Cu-GO and Zn-GO, respectively. Therefore, the O1s spectrum of GO without metal ions differs significantly both in shape, position and maximum intensity from the spectra for GO with adsorbed metal ions, which provides evidence that the oxygen-containing functional groups on the surface of GO take part in the sorption of the metal ions.

Further characterisation was performed to confirm the attachment of metal ions on the GO surface. The Raman spectrum of GO (FIG. 5a) showed the characteristic D and G bands at 1341 and 1595 $cm^{-1}$, respectively. The Raman plots of Zn-GO and Cu-GO also contained both the G and D bands, but the occurrence of a mild blue shift of the 'G band' (~9 $cm^{-1}$) for both Zn-GO and Cu-GO, and a red shift of the 'D band' (~8 $cm^{-1}$) for Cu-GO composites suggested that the Zn and Cu functionalization altered the structural vibrations of the Zn-GO and Cu-GO composites.

The X-ray diffraction pattern of GO showed a predominate peaks at 2θ~9.86° (FIG. 5b), which can be assigned as the (001) reflection corresponding to the graphite interlayer distance. This (001) reflection was also observed for the Cu-GO and Zn-GO composites. However, this peak shifted to lower 2θ values (ca. 9.08° and 9.64° for Cu-GO and Zn-GO, respectively), which is evidence of the intercalation of the metal ions. Furthermore, a significant peak broadening was observed for Cu-GO and Zn-GO compared to GO, that may originate from the particle (crystallite) size broadening or lattice strain broadening.[49] No diffraction peaks from any other impurities (such as metal oxides) were detected in the XRD data of Cu-GO and Zn-GO.

The thermal stability of the GO, Zn-GO and Cu-GO composites was also measured by a thermogravimetric (TG) analyser. As shown in FIG. 5c, GO is thermally unstable and starts to lose mass upon heating even below 100° C. The major weight loss (~70%) occurs at ~300° C. Although both Zn-GO and Cu-GO followed a similar profile as GO, their thermal stability increased compared to GO. The TG curve of GO showed a weight loss of ~98%, while the TG curves of Zn-GO and Cu-GO had lesser weight losses compared to GO, confirming the existence of Zn and Cu in the structure. The percentage of material that was not decomposed during combustion for the Zn-GO and Cu-GO composites were around 14% and 10%, respectively, which were in agreement with the acid digestion results showing the same amount of Zn and Cu.

After confirming the structure of the prepared Cu-GO and Zn-GO composites, the amount of Zn and Cu micronutrients loaded and released from the material was determined. The amount of loaded micronutrients was measured according to standard methods by using the open vessel aqua regia extraction method where 135 mg $g^{-1}$ of Zn and 100 mg $g^{-1}$ of Cu were loaded on the GO sheets. (Milani, N.; McLaughlin, M. J.; Stacey, S. P.; Kirby, J. K.; Hettiarachchi, G. M.; Beak, D. G.; Cornelis, G., Dissolution Kinetics of Macronutrient Fertilizers Coated with Manufactured Zinc Oxide Nanoparticles. *Journal of Agricultural and Food Chemistry* 2012, 60 (16), 3991-3998; Tandy, S.; Bossart, K.; Mueller, R.; Ritschel, J.; Hauser, L.; Schulin, R.; Nowack, B., Extraction of Heavy Metals from Soils Using Biodegradable Chelating Agents. *Environmental Science & Technology* 2004, 38 (3), 937-944.

Zn loading experiments were conducted at pH=6, whereas for Cu pH=4.5 was used to avoid any precipitation of the metal oxides on the surface of the GO sheets. The water solubility of Zn-GO and Cu-GO were assessed and compared with $ZnSO_4$ and $CuSO_4$ granules, respectively (FIG. 5a). The Zn-GO and Cu-GO granules released 40% and 44% of their nutrients, respectively. The lower solubility of Zn and Cu from Zn-GO and Cu-GO compared to $ZnSO_4$ and $CuSO_4$ are related to the complexation of the metal ions with the GO sheets.

Furthermore, the dissolution rate of Zn from Zn-GO and Cu from Cu-GO were studied with a column perfusion method. FIG. 6b shows the release profile of the different systems tested. The release showed a biphasic behaviour consisting of an initial burst release for 5 h, followed by an extended release that was sustained for over 72 h for both Zn and Cu from the Zn-GO and Cu-GO granules, respectively. The rapid initial release of nutrients in first 5 h is likely related to the release of physiosorbed metal salts or loosely adhered metal ions to the surface of the GO sheets. The increasing amount of sulphur (S) in the XPS survey spectra of Cu-GO and Zn-GO (2.02% and 1.69%, respectively) compared to the amount of S in the GO sheets (0.67%) confirms the physical attachment of $ZnSO_4$ and $CuSO_4$ salts during the loading process. In case of $ZnSO_4$ and $CuSO_4$ fertilizers, almost all the nutrients were released within 20 h. The large differences in the release manner of the micronutrients from the GO-based carriers compared to the $ZnSO_4$ and $CuSO_4$ granules could be explained by the enhanced interaction and attachment of the metal ions to the oxygen functional groups on the GO surface. The metal ions can also form a bidentate bond to either two adjacent carboxylate groups on a carboxylate and an adjacent phenolic OH group with an oxygen atom from each group forming a monodentate bond with $Zn^{+2}$ or $Cu^{+2}$, which makes the bonding of the metal ions to the GO surface or edges much stronger.

The pH of elutes from the column with Zn-GO was initially higher than that for $ZnSO_4$ granules. Both Zn-GO and $ZnSO_4$ showed a slight increase in the pH of the leachate within the first few hours after which the pH then remained constant over time (FIG. 7c). The reason for the slight increase of leachate pH during the leaching test from the column for Zn-based fertilizers could be related to proton consumption during dissolution of Zn species from the surface of the fertilizers granules. In contrast, the pH of the initial fractions from the columns with $CuSO_4$ and Cu-GO decreased from 6.5 to 3.6 for $CuSO_4$ and 3.4 for Cu-GO within the first few hours (2 h for $CuSO_4$ and 4 h Cu-GO, respectively). However, once the dissolution of the $CuSO_4$ granules was complete, the column elutes tended towards the higher pH values that result from the percolating solution (0.01 mol $CaCl_2$, pH 6.5). For Cu-GO, the pH of elute did not converge to the pH of the calcium chloride ($CaCl_2$) solution because the dissolution process continued and was not complete. The significant decrease in the eluted solution from the columns with Cu can be explained by the effect of pH at different speciation of $Cu^{+2}$ ions. As discussed previously, at higher pH (in the case of $Cu^{+2}$ ions, pH>6), hydrolyzed Cu species are the prominent $Cu^{+2}$ species. The hydrolysis of Cu ions to soluble $Cu(OH)_2$ produces $H^+$ ions, which makes the leachate acidic. The pH was lower for the Cu-GO treatment than for the CuSO$_4$ treatment. This may be related to the physiosorbed acid on the GO sheets during the adsorption process of the Cu ions on the GO sheets, which was conducted under acidic conditions (pH=4.5).

The mechanism of Zn and Cu release from Zn-GO and Cu-GO composites was investigated using a semi-empirical model, known as the first-order model.

$$\frac{M_t}{M_\infty} = 1 - \exp^{(-kt)} \quad (1)$$

Where Mt and M∞ represent the amount of nutrient released at time t and equilibrium, respectively, k is the constant of solubility rate and t is solubility rate. The correlation coefficients were all highly significant for Zn and Cu solubility rate with values of 0.92 and 0.95 Zn-GO and Cu-GO composites, respectively. Furthermore, the curves representing relationships between modelled and experimental measurements for slow release of Zn and Cu from Zn-GO and Cu-GO fertilisers yield a slope of 0.95 and 0.94, respectively, which shows the strength of using a first-order kinetic model to simulate the release pattern of GO-based fertilizers.

Figure 7B:
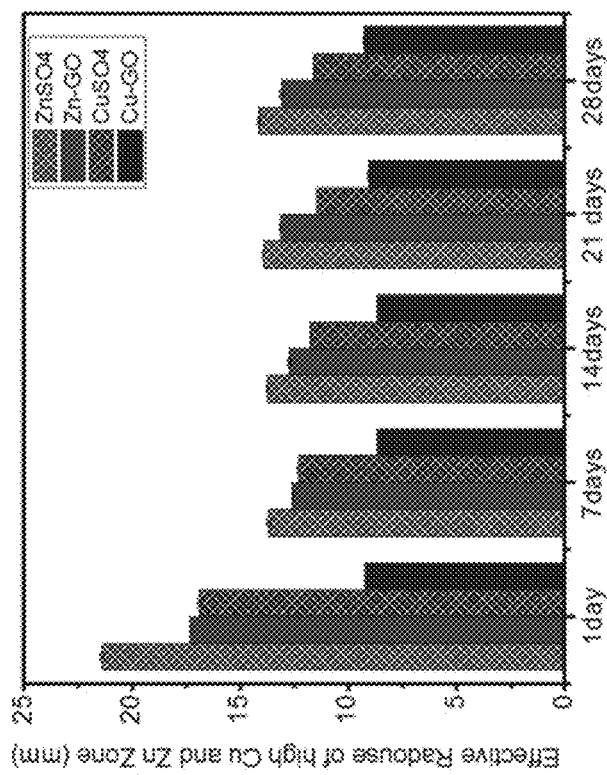
FIG. 7 shows (a) visualized Zn and Cu diffusion zones in an acid soil from $CuSO_4$, Cu-GO, $ZnSO_4$ and Zn-GO fertilizer granules (containing 10 mg of nutrient) added in the centre of a Petri dish filled with the soil and incubated for 28 days, and (b) radius of the high-Zn and high-Cu zone (derived as $\sqrt{A/\pi}$ (with A the area of the Zn and Cu diffusion zone) at 1, 7, 14, 21 and 28 days after the addition of Zn-GO, Cu-GO, $ZnSO_4$ and $CuSO_4$ fertilizers
Figure 7A:
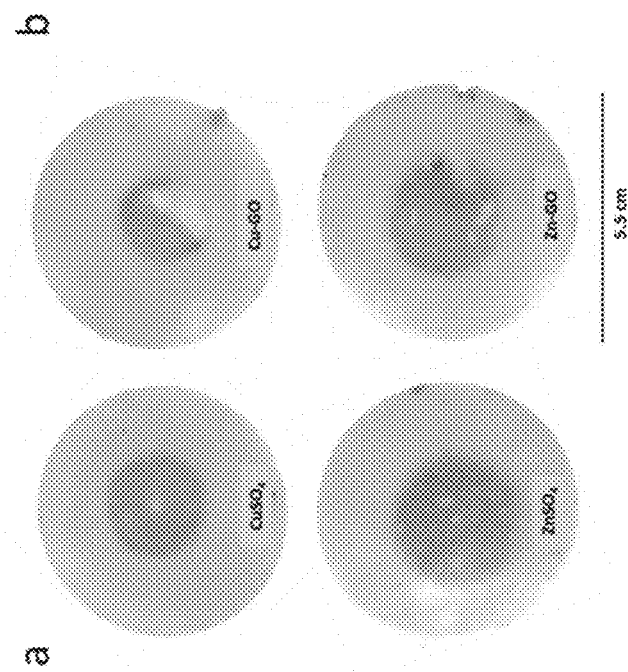

The diffusion and movement of Zn and Cu from Zn-GO and Cu-GO granules was then examined in the soil using a visualization method (Degryse, F.; Baird, R.; McLaughlin, M., Diffusion and solubility control of fertilizer-applied zinc: chemical assessment and visualization. *Plant Soil* 2015, 386 (1-2), 195-204) FIG. 7a shows the visualized Zn and Cu zones at 28 days after application of ZnSO$_4$, Zn-GO, CuSO$_4$ and Cu-GO fertilizers in the soil. The diffusion of Zn and Cu when added as ZnSO$_4$ and CuSO$_4$ were slightly higher compared to Zn-GO and Cu-GO (FIG. 7b). However, at the end of the incubation time (28 days) the difference in diffusion zone between the GO-based fertilizers (Zn-GO and Cu-GO) and the soluble salts (ZnSO$_4$ and CuSO$_4$) became smaller. This can be explained by the gradual release of metal from the GO fertilizers. For all components, the radius of the diffusion zone decreased between day 1 and day 7 which can be explained by the saturation of the sorption sites around the application sites of the fertilizer granules, as the initial concentrations of Cu and Zn were very high resulting in little solid-phase buffering and fast release. Within a day, the diffusion transported Zn and Cu over a volume of soil that has enough adsorption capacity to strongly retain the Zn and Cu and their further movements was slower. Furthermore, lower diffusion of Cu from Cu-based materials compared to Zn diffusion from Zn-based fertilizers was related to the lower mobility of Cu in the soil.

The chemical analysis results for the diffusion of Zn from ZnSO$_4$ and Zn-GO, and Cu from CuSO$_4$ and Cu-GO fertilisers are presented in Table 1, chemical analysis results on soil concentrically sampled around the fertilizer application sites at 28 days after addition of Zn and Cu fertilizers (at 10 mg Zn; ZnSO$_4$, Zn-GO and 10 mg Cu; CuSO$_4$ and Cu-GO). pH and solution concentrations of Zn and Cu in a 1 mM CaCl$_2$ extract from different soil sections and the percentage of added Zn and Cu recovered at <9 mm from the granules were measured (standard error of 3 replicates between brackets). The values measured from the Zn and Cu diffusion zones determined by the chemical methods followed the same sequence as the visualization results. In the case of ZnSO$_4$ and Zn-GO granules, similar amounts of Zn were recovered at >9 mm from the granules, 30% and 28%, respectively. In soil with CuSO$_4$ granules, 31.5% of Cu were recovered at >9 mm while in soil with Cu-GO granules 19% of Cu recovered, which agrees with the results of the visualization method, which also showed a larger difference between the GO fertilizer and the soluble salt for the Cu fertilizers.

TABLE 1

| Fertilizer | pH | | Zn or Cu solution concentration (µg/L) | | % of added metal (Zn or Cu) | |
|---|---|---|---|---|---|---|
| | <9 mm | >9 mm | <9 mm | >9 mm | at <9 mm | at >9 mm |
| ZnSO$_4$ | 6.55(0.02) | 6.42(0.08) | 2067(0.06) | 289(0.02) | 70(0.00) | 30.0(0.00) |
| Zn-GO | 6.62(0.07) | 6.33(0.02) | 4199(0.06) | 570(0.04) | 71(0.06) | 28.0(0.00) |
| CuSO$_4$ | 6.08(0.06) | 6.40(0.03) | 2209(0.08) | 331(0.01) | 68(0.02) | 31.5(0.00) |
| Cu-GO | 6.20(0.05) | 6.40(0.05) | 2395(0.1) | 148(0.02) | 82(0.01) | 19.0(0.01) |

Methods

Graphene Oxide (GO) (Graphene Support) Preparation

The improved Hummer's method was used to synthesize the GO sheets directly from the graphite flakes in which a mixture of sulphuric acid/phosphoric acid (H$_2$SO$_4$/H$_3$PO$_4$) (360:40 mL) was added to 3.0 g of graphite flakes and 18.0 g potassium permanganate (KMnO$_4$) and was kept at 50° C. under continuous stirring overnight. The mixture was allowed to cool to room temperature before pouring onto ice with hydrogen peroxide (H$_2$O$_2$) (3 mL). The remaining solid material was then diluted in 200 ml of Milli-Q water and centrifuged at 4000 rpm for 2 h after which the supernatant was removed. The solids were washed in succession with 200 mL of 30% hydrochloric acid (HCl) and twice with 200 mL of ethanol (4000 rpm for 2 h). The precipitants were then vacuum-dried overnight at room temperature to obtain a brown product, which was GO.

Figure 2:
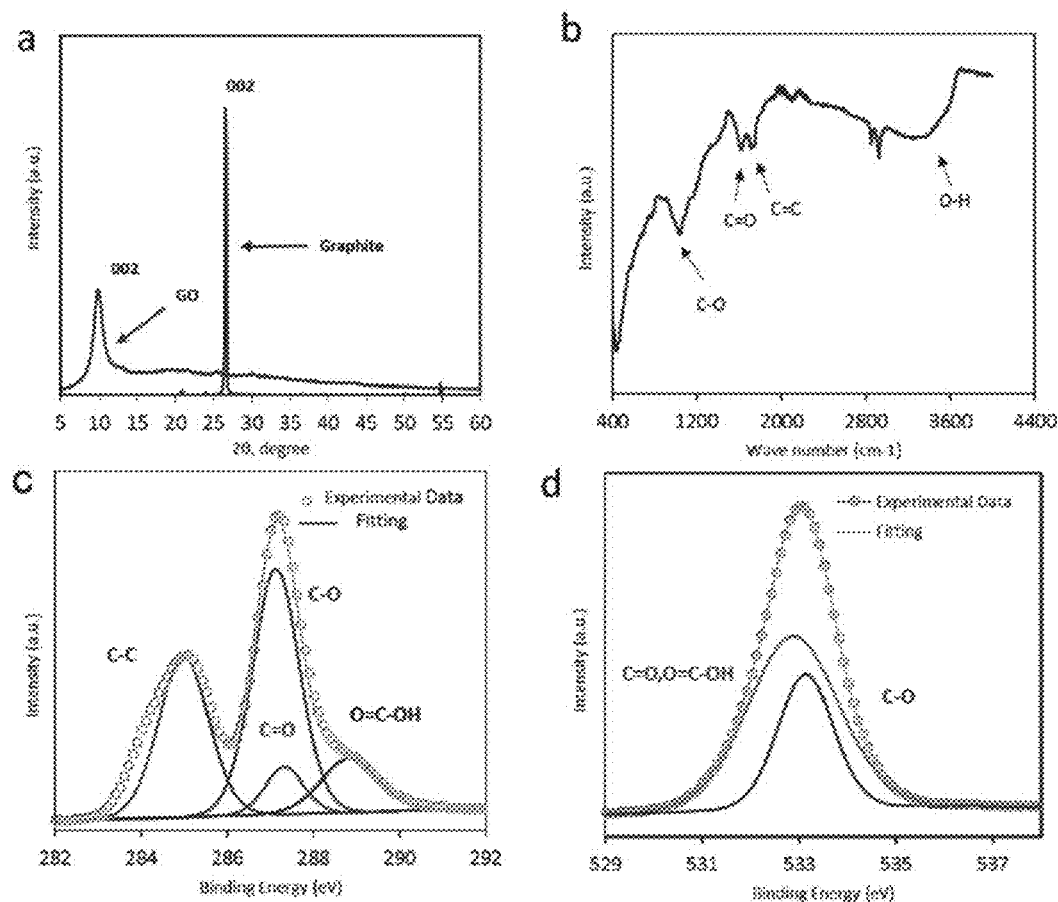
FIG. 2 shows (a) XRD patterns of graphite and graphene oxide (GO), (b) FTIR spectra of GO, (c) XPS spectrum of the C1s peak and (d) XPS spectrum of the O1s peak of graphene oxide sheets.

Characterization of the GO was carried out using X-ray diffraction spectroscopy (XRD, FIG. 2a). The intensive diffraction peak of graphite at around 2θ=26.6° corresponds to an interplanar spacing of (002) hexagonal layers of carbon atoms. This intensive peak disappears in the XRD pattern of GO sheets and is replaced with a broad and weak peak at 2θ=9.9° which is characteristic of GO. Fourier transform infrared spectroscopy (FTIR) confirms the presence of oxygen-containing functional groups on the surface of GO (FIG. 2b). The broad band between 2600-3800 cm$^{-1}$ results from the presence of hydroxyl groups due to the intercalated water and structural hydroxyl groups (—COOH and —COH) of GO. The bands at 1720-1740 cm$^{-1}$ are associated with the stretching vibration of the C=O bond, and the band at 1620 cm$^{-1}$ can be assigned to C=C skeletal vibrations of the non-oxidized graphitic domain, 1590 cm$^{-1}$ is related to the stretching of C=C bonds, and the bands at 1240 and 1250 cm$^{-1}$ are associated with C—O. Similarly, the high resolution C1s spectra of GO (FIG. 2c) obtained by X-ray photoelectron spectroscopy (XPS) revealed four peaks that corresponded to the following functional groups: carbon $sp^2$ (C=C, 284.9 eV), epoxy/hydroxyls (C—O, 287.1 eV), carbonyl (C=O, 287.3 eV), and carboxylates (O—C=O, 288.8 eV). The XPS spectrum of O1s (FIG. 3d) was deconvoluted into two peaks. The first peak with a binding energy of 532.8 eV can be assigned to C—O. The second peak with a binding energy of 533.1 eV is associated with C=O and O=C—OH, carbonyl oxygen atoms in the carboxylic groups and esters.

Batch Adsorption and pH Experiments

Batch adsorption experiments were carried out individually for $Cu^{+2}$ and $Zn^{+2}$ to examine the effect of contact time and pH on the metal ions adsorption on GO sheets. Experiments were carried out in 250 mL conical flasks with 5 mg of adsorbent (GO) and 100 mL of $Cu^{+2}$ or $Zn^{+2}$ solution (20 mg $L^{-1}$) in Milli-Q water at room temperature and were mixed in a shaker (RATEK-digital Shaker model OM7) at 150 rpm. The effect of pH on Cu and Zn adsorption was assessed in the pH range of 3-8. The pH values of the suspensions were adjusted with 0.1 mol $L^{-1}$ $H_2SO_4$ or $NH_4OH$ solution. The suspensions were shaken for 60 minutes and filtered through a 0.45 μm filter paper. The metal ions concentrations were analysed with inductively-coupled plasma optical emission spectroscopy (ICP-OES, Spectro, Kleve, Germany).

The kinetics of sorption were tested at a fixed pH of 4.5 and 6. Solutions with a Cu or Zn concentration of 20 mg $L^{-1}$ were equilibrated with the GO adsorbent (5 mg) for 10, 20, 30, 45, 60, 75, 90 and 120 minutes. The suspensions were filtered with 0.45 μm filter papers after the specified contact time. The amount of Cu and Zn ions $q_t$ (mg $g^{-1}$) adsorbed by the adsorbent at time t, was calculated using the following equation:

$$q_t = \frac{(C_0 - C_t) * V}{M}$$

Where $C_0$ and $C_t$ are the initial and time t concentration of the heavy metal ions solution, respectively, while V is the volume of solution (L) and M is the mass of the composite used (g).

Cu and Zn Loading on Graphene Oxide Sheets to Form the Slow Release Fertiliser

To prepare Cu-loaded GO (Cu-GO) and Zn-loaded GO (Zn-GO) slow release fertilizers, $CuSO_4 \cdot 5H_2O$ and $ZnSO_4 \cdot 7H_2O$ salts were used. 1 mM of Cu and Zn ions were added to 1 L of GO solution (1 mg $L^{-1}$). The pH of the GO solution for the adsorption was fixed at 4.5 for Cu and at pH 6 for Zn. The suspensions were mixed on a shaker for 60 minutes for Cu loading and 120 minutes for Zn loading. The loaded GO suspensions were centrifuged at 4200 rpm for 30 minutes. The precipitates at the bottom of tubes were collected and semi-dried in an oven at 50° C. overnight. The semi dried materials were then cut into cubes with dimensions of 0.5 mm by 0.5 mm.

Total and Water-Soluble Zn and Cu Concentrations of Zn-GO and Cu-GO Fertilizers

The total Zn and Cu concentrations of the individual granules were determined using an open vessel aqua regia extraction method (9 mL HCl/3 mL of nitric acid ($HNO_3$) followed by analysis of the digest solutions using ICP-OES (Spectro, Kleve, Germany).

Water-soluble Zn and Cu concentrations of granules were measured by agitating 0.5 g of each fertilizer granule in 30 mL of ultrapure deionized water (Millipore) for 24 h in an end-over-end shaker. The samples were then centrifuged for 20 min at 4000 rpm and filtered before analysis by ICP-OES.

Other suitable metals apart from Zn and Cu can be employed, such as but not limited to potassium, magnesium, sulphur, chromium, nickel, boron, cobalt, iron, manganese and calcium.

Dissolution Kinetics Study of Zn-GO and Cu-GO Fertilizers Using Column Perfusion Dissolution kinetic experiments were conducted as described in our previous work,[51] but using glass wool instead of quartz sand as porous medium. The dissolution kinetics were assessed for the Cu-GO and Zn-GO granules and also for Zn sulphate ($ZnSO_4 \cdot H_2O$) and Cu sulphate ($CuSO_4 \cdot 5H_2O$) granules as reference. Granules with a total amount of Cu or Zn of 50 mg were placed in each polypropylene column (150 mm×15 mm), then filled with acid-washed glass wool. A 10 mM $CaCl_2$ solution (pH 6) was introduced from bottom of the column using a peristatic pump with a constant flow rate of 10 mL $h^{-1}$. A fraction collector (SuperFrac™, Pharmacia) was used to collect the solution from the top of the column every hour for 72 hours. The solution pH of all collected fractions was measured. The total Cu and Zn concentrations in each fraction were measured using ICP-OES. All treatments were replicated twice.

Zinc and Copper Visualization Method

Petri dishes with a diameter of 5.5 cm and 1 cm height were filled with wetted soil, covered with the lids, and incubated at 25° C. oven. All products ($CuSO_4 \cdot 5H_2O$, $ZnSO_4 \cdot H_2O$, Cu-GO and Zn-GO granules) were applied in the centre of a Petri dish at the same rate (10 mg per Petri dish) about 4 mm below the soil surface. Three replicates were applied for each formulation. The Petri dishes were then placed in a plastic bag with moist paper towels to avoid water loss from the soil and incubated at 25° C. The diffusion was monitored at 1, 7, 14, 21 and 28 days using a visualization method described by Degryse et al.[58] Calcium carbonate ($CaCO_3$)-impregnated filter papers were used as a sink for Zn and Cu, as $CaCO_3$) sorbs Zn and Cu through surface complexation and precipitation.[59-60] The different steps of the Cu and Zn visualization method are described briefly below.

(i) Preparation of $CaCO_3$-Impregnated Filter Papers

Whatman No. 1 filter papers were soaked in 1 M $CaCl_2$ solution for at least half an hour. The papers subsequently were transferred to 0.4 M ($Na_2CO_3$) solution to precipitate $CaCO_3$ in the paper. The papers were placed in deionised water for few minutes to rinse and then placed on a clean paper towel to dry.

(ii) Deployment

The $CaCO_3$ papers were marked with water insoluble paper and were rewetted with deionised water before placing onto the soil in the petri dishes. Different deployment times were used based on the contact time between the soil and fertilizers. For petri dishes with contact time of the fertilizers and soil up to 1 day, a 2-hour deployment used while 3-hours deployment applied for contact times up to 1 week. A 4-hours deployment time was applied when fertilizers were in contact with the soil for more than 1 week. After the deployment, the papers were removed from the soil surface with tweezers and rinsed with deionised water to remove any attached soil and then placed on a clean surface.

(iii) Development and Image Analysis

The dithizone reagent used for the detection of Cu and Zn was prepared freshly by 60-fold dilution of a 5 g $L^{-1}$ of its stock solution. The stock solution was prepared by mixing 50 mg of dithizone in 0.5 ml of ethanol and 0.1 ml of concentrated ammonia following by diluting in 10 ml deionized water. 0.4 ml of the diluted solution was dropped on top of the each filter paper to fully cover its surface, resulting in a pink or blue colour at high loading of Zn or Cu on the paper, respectively. In this way, a mirror image of the metal diffusion zone in the soil is obtained. The papers were scanned while they were still moist by placing them in transparent plastic sleeves. The size of the blue zone in the case of Cu based fertilizers and the pink zone in the case of Zn based fertilizers were quantified using imaging software (ImageJ). The results for all the visualization times were expressed as the effective radius ($r_{eff}$), $$r_{eff} = \sqrt{\frac{A}{\pi}}$$

where A is the area of the blue or pink zone.

Measuring Soil pH and Total Zn and Cu in the Soil

At the end of the 28-day incubation period, the pH of the soil and $CaCl_2$-extractable and total amounts of Zn and Cu in the incubated soils were determined for two concentric soil sections (0-1.2 cm and >1.2 cm from the fertilizer application point) as described by Lombi et al.[61] The soil samples from the inner and outer sections of the circle were oven dried and homogenised. A 1 mM $CaCl_2$ solution was added to the soil so that a liquid: solid ratio of 10 L $Kg^{-1}$ was obtained. The resulting suspensions were equilibrated on an end-over-end shaker for 3 days and 5 ml of solution was sampled after centrifuging at 4000 rpm for 30 min. The solution was filtered over a 0.45 μm filter and analysed by ICP-OES to determine the concentration of Zn and Cu. The pH of the samples was measured on the remaining supernatant.

The total amount of added Zn and Cu was determined by cold acid extraction with 3M $HNO_3$ in a liquid: solid ratio of 50 L $kg^{-1}$. The mixture of acid and soil samples were shaken on an end-over-end shaker for 2 days. The added Zn and Cu recovered in each soil section was calculated from following equation:

$$M_i = (c_i - c_{bg}) \cdot W_i$$

where $M_i$ is the amount of added Zn and Cu (mg) recovered in section i, $c_i$ and $c_{bg}$ are the concentration of Zn or Cu (mg $kg^{-1}$) in the soil section for the fertilizer treatment or in the unamended soil, and $W_i$ is the weight of soil in that section (kg).

Macronutrients

In order to bind phosphorus (P) to GO, the GO surface first needs to undergo surface modification. This was accomplished by first loading FeO(OH) (iron (III) oxide-hydroxide) onto the GO in order to achieve a high surface area with sufficient affinity to bind phosphorus. Using this approach loadings of phosphorus up to approximately 5.2% w/w were obtainable.

The FeO(OH) acts as a bridging link between the GO and the phosphorus, to form the representative formulae GO—FeO(OH)—P. The general formulae therefore is either G-Metal-macronutrient or G-Metal-micronutrient, with the metal or metal oxide hydroxide acting as a bridging link between the G/GO and the nutrient. Fe can also be used as can other metallic cations, such as but not limited to lithium, beryllium, sodium, magnesium, potassium, calcium, scandium, copper, zinc, aluminium. We have utilised both FeO(OH) and Fe with different ratios of GO, such as, but not limited to:

GO:Fe or GO:FeO(OH)=1:0.1
GO:Fe or GO:FeO(OH)=1:0.5
GO:Fe or GO:FeO(OH)=1:1

After the Fe or FeO(OH) was loaded onto the GO the change in charge (Z potential (mV)) was measured as show in FIG. 7. Phosphorus was then subsequently loaded onto the GO:Fe or GO:FeO(OH) mixtures and the loading potential determined.

| Example | Composite | mg P/g |
|---|---|---|
| 1 | GO:Fe = 1:0.1 pH 3 | 0/1.73 |
| 2 | GO:Fe = 1:0.5 pH 3 | 13.55 ± 0.95 |
| 3 | GO:Fe = 1:1 pH 3 | 19.13 ± 4.04 |
| 4 | GO:Fe = 1:0.1 pH 7.5 | ND |
| 5 | GO:Fe = 1:0.5 pH 7.7 | 35.42 ± 0.17 |
| 6 | GO:Fe = 1:1 pH 7.7 | 48.93 ± 8.60 |
| 7 | GO:FeOOH = 1:0.1 pH 3 | 5.64 ± 1.11 |
| 8 | GO:FeOOH = 1:0.5 pH 3 | 16.55 ± 3.19 |
| 9 | GO:FeOOH = 1:1 pH 3 | 52.02 ± 5.25 |
| 10 | GO:FeOOH = 1:0.1 pH 7.6 | 28.11 ± 4.3 |
| 11 | GO:FeOOH = 1:0.5 pH 7.2 | 31.83 ± 4.49 |
| 12 | GO:FeOOH = 1:1 pH 7.7 | 40.36 ± 5.82 |

As seen in examples 6, 9 and 12, the loading of phosphorus achievable was dramatic. Other bridging links could also be utilised to achieve the same functionality of binding the macronutrient, such as phosphorus, to the surface of the GO. Other macronutrients such as but not limited to nitrogen (N), potassium (K) and sulphur (S) can also be loaded onto the GO by way of using the bridging link.

Co-Granulation

The hardness of the resultant fertiliser material also increased significantly. Our experiments showed that by co-granulating fertilizer material with graphene or GO the resultant material had an unexpected increase in hardness, impact resistance and abrasion resistance than otherwise might have been expected.

Initial experiments were based on the use of MAP (mono ammonium phosphate) fertilizers used as a model fertilizer and go-granulating this with graphene or GO at rates of 0.05%, 0.1%, 0.2% and 0.5%. The MAP and graphene or GO material were mixed together and granulated in a rotary drum.

Figure 8:
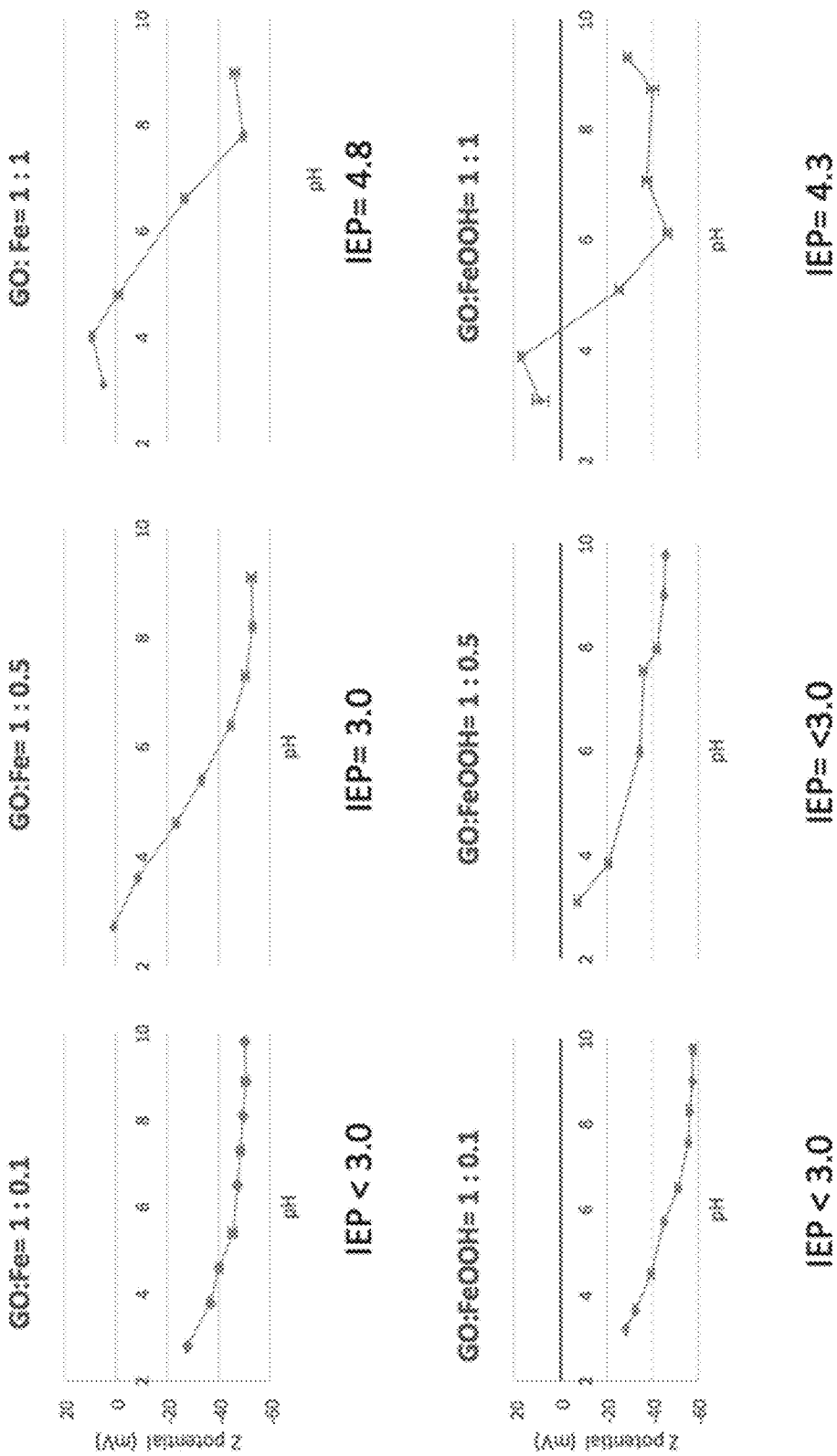
FIG. 8 shows a measurement of Z potential versus pH for varying ratios of graphene or graphene oxide in relation to Fe or FeO(OH)
Figure 9:
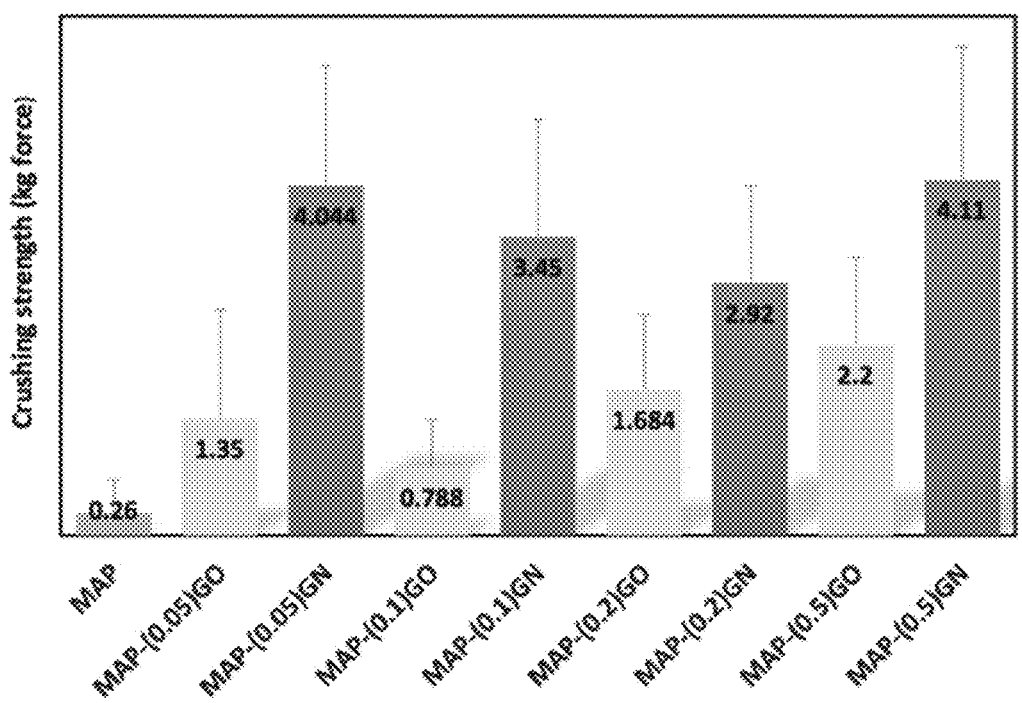
FIG. 9 is a graph showing changes in crushing strength of co-granulated fertiliser material.

Examples of the co-granulated MAP-graphene or MAP-GO were obtained by spraying water onto a tumbling bed of fertiliser graphene or GO and crushing strength determined using calibrated proving ring penetrometer force gauge (kg force) used to measure hardness of fertilizers. Surprisingly, the MAP-graphene (0.05%) co-granulation product exhibited an increase of 15 times the crushing strength compared to MAP alone, as shown in FIG. 8. Upon drying the co-granulated MAP-GO samples (50° C.), the granule strength further increased compared to samples dried at room temperature. FIG. 9.

Figure 10:
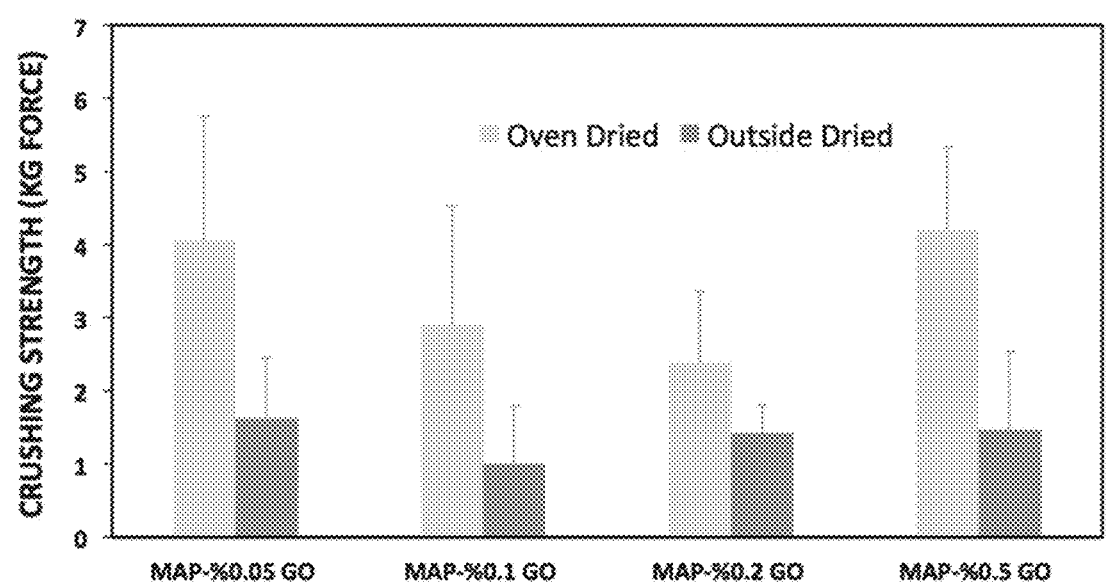
FIG. 10 is a graph showing changes in crushing strength of co-granulated fertiliser material after oven drying.
Figure 11:
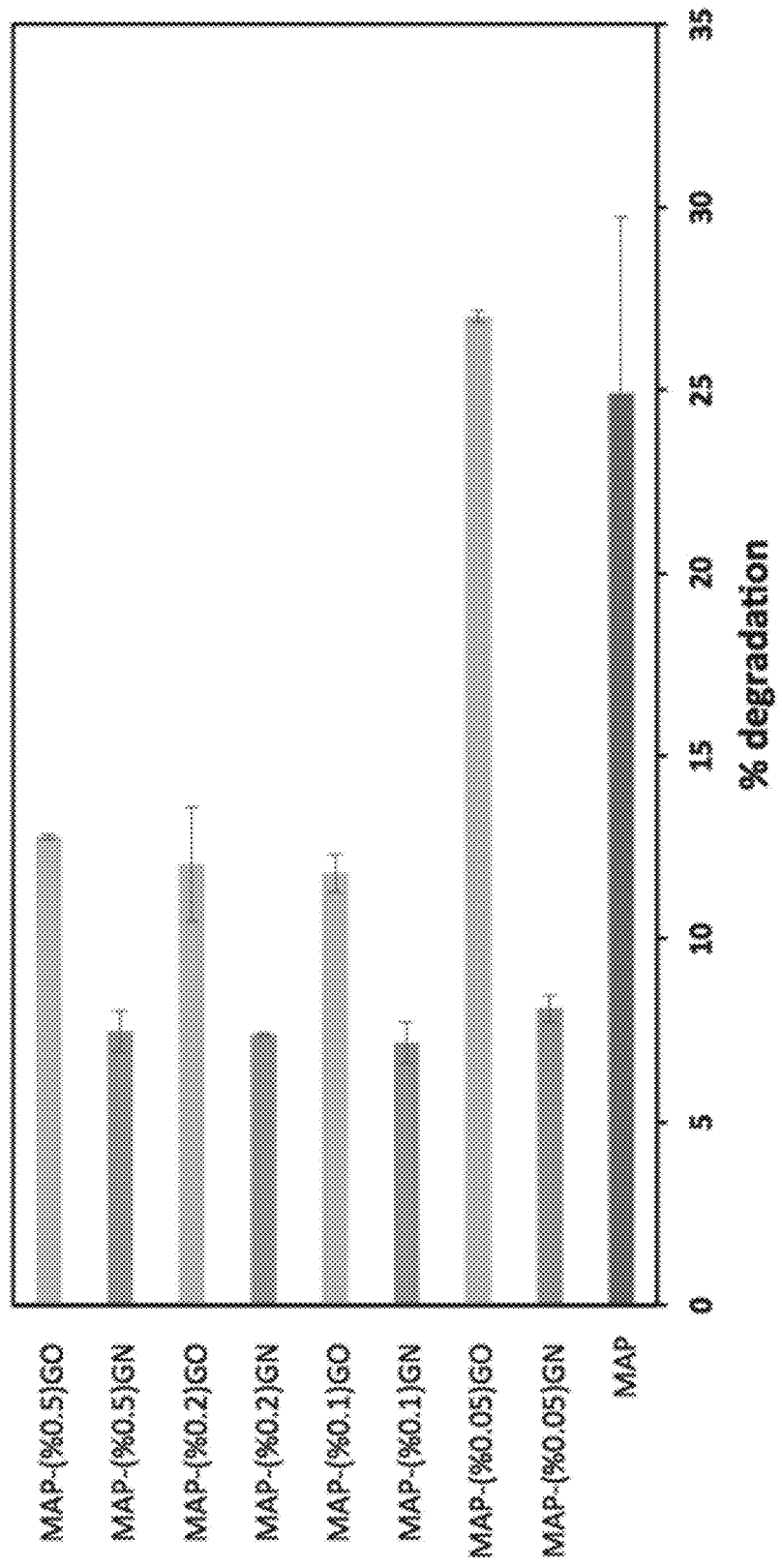
FIG. 11 is a graph of abrasion tests of MAP-graphene (GN) and MAP-GO.
Figure 12:
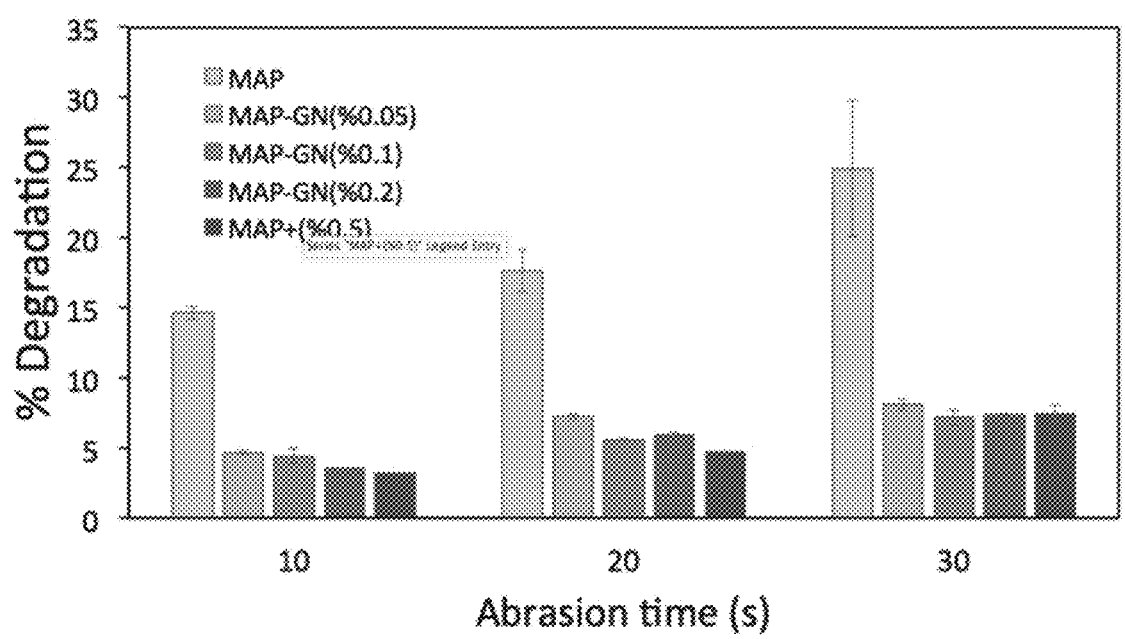
FIG. 12 is a graph showing percentage degradation over varying times.
Figure 13:
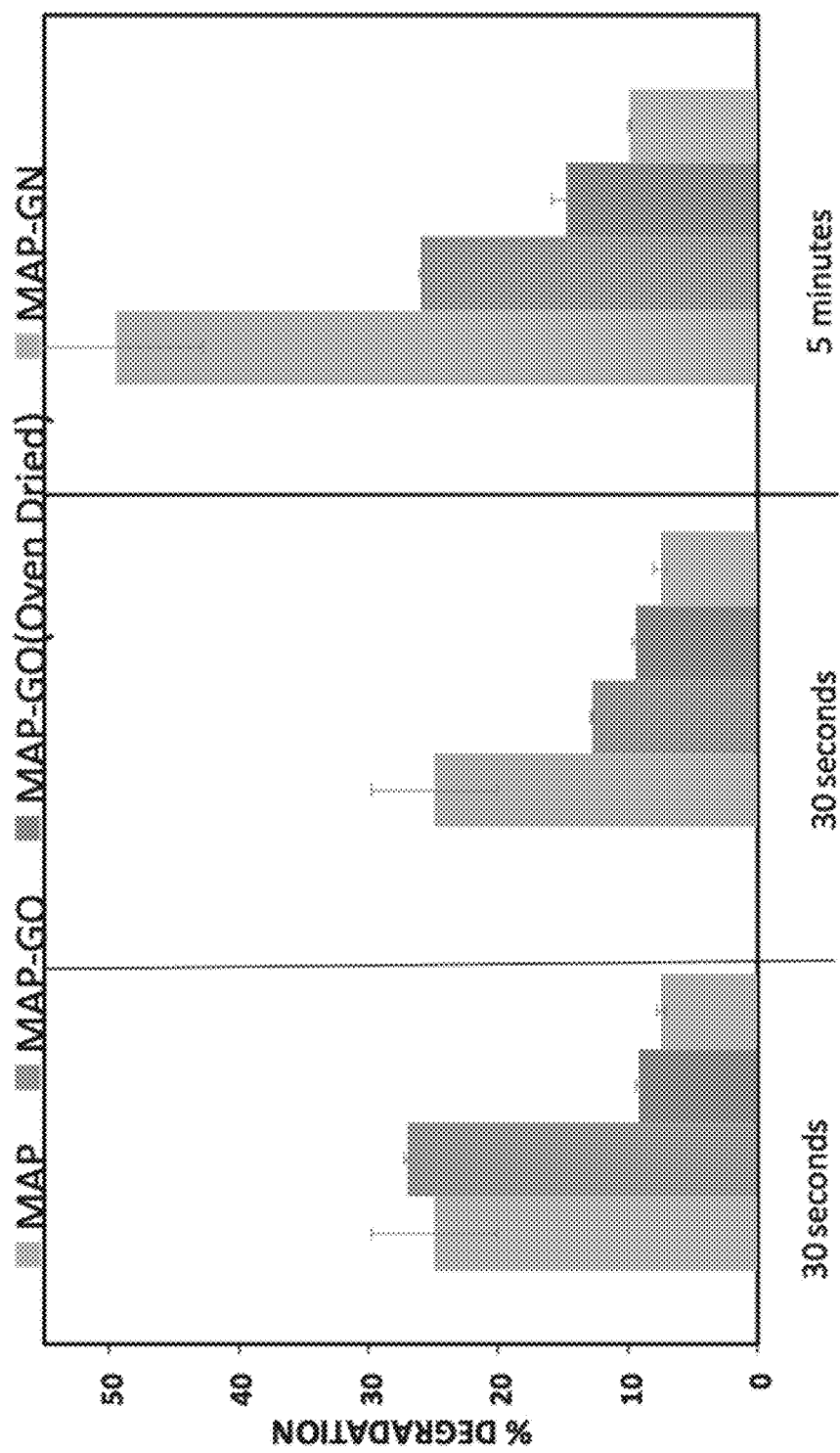
FIG. 13 is a graph of percentage degradation of MAP-graphene (0.05%).

Abrasive test where then carried out and the co-granulated MAP-graphene or MAP-GO samples showed a significant reduction in percentage degradation (30s test), with the MAP-graphene co-granulated product exhibiting greater less degradation compared to the MAP-GO samples. FIGS. 10-12

The observed increase in the physical qualities of the MAP granules, by inclusion of relatively small amounts of graphene or Go, was entirely unexpected and provides a way in which fertiliser material, such as, but not limited to MAP, can be co-granulated to provide a more impact resistance fertiliser which greatly improves the usability of the fertiliser product. For example, fertiliser material co-granulated in the above manner would be more resistant to crushing during transport, handling and delivery. Less fertiliser dust would be produced, thus making the handling of the material more efficient and safer and also providing a greater delivery of fertiliser material to the plants when broadcast over a wide area. This then would ensure that the co-granulated fertiliser material is more likely to be intact when applied. Other fertiliser material that is not as robust tends to break down upon impacting the ground, or even during transport, creating a fine dust, which results in the fertiliser material dissolving quicker and thus delivering the nutrients to the soil quicker than what is required for a slow fertiliser product, thus requiring more frequent applications.

Utilisation of the above has been able to provide novel fertilizer material that has quite unexpectedly shown to have high loadings of nutrient elements bound to the surface of the graphene/graphene oxide support structures of up to 5.2% P (wt/wt) or up to 13% Zn (wt/wt) or 10% Cu (wt/wt). Theses nutrients, both macronutrient and micro nutrients, bound to the graphene/graphene oxide exhibit both a fast and slow-release characteristic, which can be very advantageous in field situations where seedling establishment needs high nutrient loadings early in the growth cycle, and at later stages in the crop growth cycle continuing release of nutrient is needed.

This shows that GO sheets can be used as a carrier for essential plant micronutrients such as Zn and Cu, as well as other plant nutrients, as slow release fertilizers. The prepared fertilizers (Zn-GO and Cu-GO) were synthesized by the adsorption of metal ions onto graphene oxide sheets. Significant loadings of both Zn and Cu were obtained—an important attribute for any carrier-based fertilizer system where significant dilution of nutrient content is undesirable. The GO-based materials (Zn-GO and Cu-GO) demonstrated biphasic release i.e. the supply of both fast-release and slow-release micronutrient, which are very advantageous in field situations where seedling establishment needs high nutrient loadings, and at later stages in the crop growth cycle continuing release of nutrient is needed.

Moreover, we have found that by the use of the present invention there was a significant reduction in the loss of nutrients from the novel fertiliser material compared with traditional slow release fertiliser compositions in which the fertilizer is typically coated with coating designed to reduce the exposure of the inner fertiliser core to surrounding moisture, thus slowly releasing the fertiliser material to the surrounding environment. The present invention does away with relying on any outer core that acts to shield the fertiliser material.

The invention claimed is:

1. A fertilizer composition including a graphene support and a fertilizer material comprising a micronutrient, wherein a surface of the graphene support has a plurality of functional groups comprising oxide-hydroxides of metal, and wherein at least one of the functional groups is FeO(OH).

2. The fertilizer composition of claim 1, wherein the graphene support is selected from the group consisting of graphene, graphene oxide, and mixtures thereof.

3. The fertilizer composition of claim 1, wherein the fertilizer material further comprises a primary nutrient or macronutrient.

4. The fertilizer composition of claim 1, wherein the micronutrient is at least one selected from the group consisting of copper, potassium, zinc, magnesium, manganese, sulphur, chromium, nickel, boron, cobalt, iron, and calcium.

5. The fertilizer composition of claim 3, wherein the primary nutrient is at least one selected from the group consisting of nitrogen, phosphorus and potassium.

6. The fertilizer composition of claim 1, wherein the fertilizer material includes a primary nutrient and at least one micronutrient.

7. The fertilizer composition of claim 1, wherein the at least one micronutrient is selected from the group consisting of zinc, copper, and iron.

8. The fertilizer composition of claim 1, wherein the surface of the graphene support also has a plurality of functional groups comprising a metal or metal cation.

9. The fertilizer composition of claim 8, wherein the plurality of functional groups comprises a metal cation selected from the group consisting of a monovalent metal cation, a divalent metal cation, and a trivalent metal cation.

10. The fertilizer composition of claim 8, wherein the metal or metal cation is selected from the group consisting of $Li^+$, $Na^+$, $Mg^{2+}$, $Fe^0$, $Fe^+$, $Fe^{2+}$, $Fe^{3+}$, $Ni^{2+}$, $Zn^{2+}$, $Co^{2-}$, $Al^{3+}$, $K^+$, $Bi^{3+}$, $Mn^{+2}$, $Mn^{30\ 3}$, and $Cu^{2+}$.

11. The fertilizer composition of claim 8, wherein the micronutrient is bonded to the functional groups.

12. The fertilizer composition of claim 1, wherein the fertilizer composition is a slow release fertilizer composition, and wherein the fertilizer material forms a continuous coating around the graphene support.

13. A method of fertilizing a plant, the method comprising:
preparing a fertilizer composition, the fertilizer composition including a graphene support and a fertilizer material, the graphene support being coated with the fertilizer material, and
applying the fertilizer composition to an agricultural crop, wherein the step of preparing includes providing a plurality of graphene support structures, the graphene support structures having a plurality of functional groups thereon, providing a fertilizer material in a salt form such that the plurality of graphene support structures are at least partially coated with the fertilizer material, and heating the at least partially coated graphene support structures to form a coating of fertilizer material on the graphene support structures.

14. The method of claim 13, wherein the fertilizer material in a salt form is a nutrient salt.

15. The method of claim 14, wherein the nutrient salt is selected from the group consisting of aluminum sulfate, amino acid salt, ammonium chloride, ammonium molybdate, ammonium nitrate, ammonium phosphate, ammonium phosphate-sulfate, ammonium sulfate, borax, boric acid, calcium ammonium nitrate, calcium silicate, calcium chloride, calcium cyanamide, calcium nitrate, copper acetate, copper nitrate, copper oxalate, copper oxide, copper sulfate, diammonium phosphate, iron- ethylenediamine-N,N'-bis, iron-ethylenediaminetetraacetic acid, ferric sulfate, ferrous ammonium phosphate, ferrous ammonium sulfate, ferrous sulfate, gypsium, humic acid, iron ammonium polyphosphate, iron chelates, iron sulfate, lime, magnesium sulfate, manganese chloride, manganese oxide, manganese sulfate, monoammonium phosphate (MAP) , monopotassium phosphate, polyhalite, potassium bromide, potassium chloride (MOP), potassium nitrate, potassium polyphosphate, potassium sulfate, sodium chloride, sodium metasilicate, sodium molybdate, sodium nitrate, sulfate of potash (SOP), sulfate of potash-magnesia (SOP- M), superphosphate, triple superphosphate, zinc oxide, zinc sulfate, zinc carbonate, zinc phosphate, and zinc chelates, as well as combinations of one or more of these salts.

\* \* \* \* \*